United States Patent
Forssell et al.

(10) Patent No.: US 6,683,860 B1
(45) Date of Patent: Jan. 27, 2004

(54) METHOD AND ARRANGEMENT FOR TRANSFERRING INFORMATION IN A PACKET RADIO SERVICE

(75) Inventors: Mika Forssell, Espoo (FI); Janne Parantainen, Helsinki (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/522,156

(22) Filed: Mar. 9, 2000

(30) Foreign Application Priority Data

Mar. 11, 1999 (FI) .................................................. 990538

(51) Int. Cl.$^7$ ................................................ H04Q 7/00
(52) U.S. Cl. ...................................... 370/329; 370/431
(58) Field of Search .............................. 370/310, 328, 370/329, 336, 345, 347, 348, 431, 437, 442, 466–69, 474, 476; 455/403, 422, 450, 451, 452, 455

(56) References Cited

U.S. PATENT DOCUMENTS 6,396,827 B1 * 5/2002 Paivike et al. .............. 370/347
6,490,271 B1 * 12/2002 Erjanne ...................... 370/347
6,532,225 B1 * 3/2003 Chang et al. ................ 370/341
6,608,828 B1 * 8/2003 Balachandran .............. 370/349

FOREIGN PATENT DOCUMENTS

EP       1251708 A1 * 10/2002 ............ H04Q/7/38

* cited by examiner

Primary Examiner—David Vincent
(74) Attorney, Agent, or Firm—Perman & Green, LLP

(57) ABSTRACT

The invention relates generally to a method and an arrangement for transferring information in a packet radio service. The invention further concerns the technology of allocating resources for individual radio connections at the interface between a transmitting device and a receiving device, especially the allocation of radio resources for a packet-switched radio connection. According to the invention a new TBF is created (306) e.g. when data transfer requires a change of communication parameters (305), and thus there are no pauses in the data transfer due to the release procedures of the existing TBF. The inventive solution saves network resources and facilitates providing simultaneously different services, such as transferring IP telephony and Mobility Management messages.

21 Claims, 7 Drawing Sheets

Figure 1A:
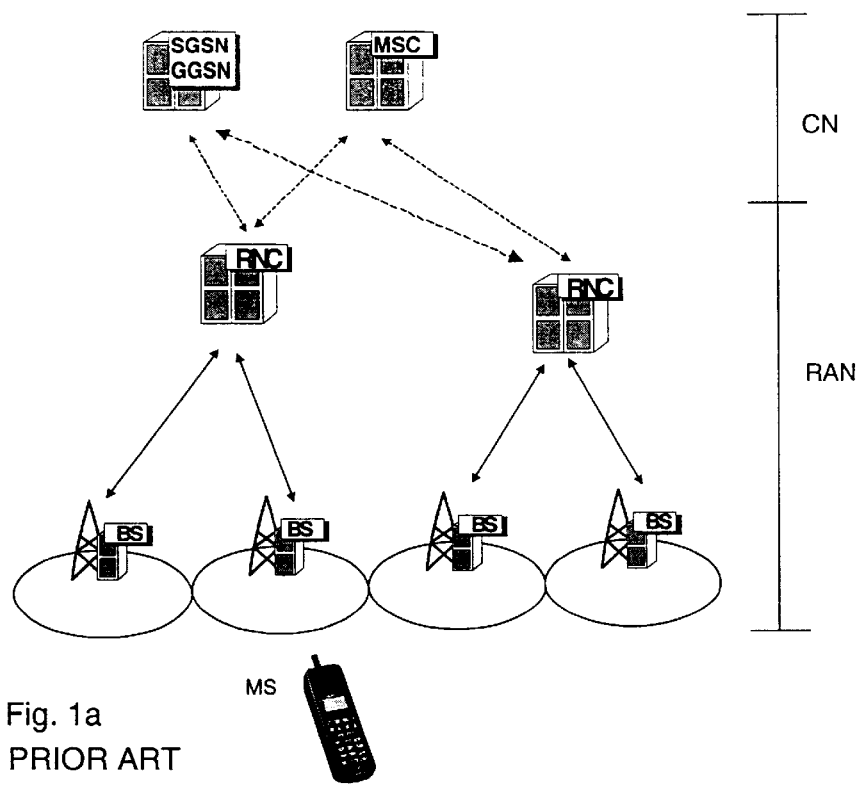

········· Signalling Interface
——— Signalling and Data Transfer Interface

METHOD AND ARRANGEMENT FOR TRANSFERRING INFORMATION IN A PACKET RADIO SERVICE

The invention relates generally to a method and an arrangement for transferring information in a packet radio service. The invention further concerns the technology of allocating resources for individual radio connections at the interface between a transmitting device and a receiving device, especially the allocation of radio resources for a packet-switched radio connection.

The term "mobile telecommunications system" refers generally to any telecommunications system which enables a wireless communication connection between a mobile station (MS) and the fixed parts of the system when the user of the mobile station is moving within the service area of the system. A typical mobile communications system is a Public Land Mobile Network (PLMN). The majority of mobile telecommunications systems in use at the time of the filing of this patent application belong to the second generation of such systems, a well-known example being the GSM system (Global System for Mobile telecommunications). However, the invention also applies to the next or third generation of mobile telecommunications systems, such as a system known as the UMTS (Universal Mobile Telecommunications System) which currently undergoes standardisation.

Multi-user radio communication systems must have well-defined procedures for allocating radio resources (time, frequency) to individual radio connections. In this patent application we will consider especially packet-switched radio connections in cellular radio systems where each cell comprises a base station which is arranged to communicate with a multitude of mobile stations. As an example we will discuss the well-known GPRS system (General Packet Radio Service), the known resource allocation procedures of which are laid down in the technical specification number GSM 04.60 published by ETSI (European Telecommunications Standards Institute) [1].

Packet switched wireless networks, such as GPRS (General Packet Radio Service), are designed to provide data services, e.g. Internet services, cost-effectively. In GPRS the channels are not dedicated to one user continuously but are shared between multiple users. This facilitates efficient data multiplexing. However, different kind of data services have different requirements for the data connection. For example, Internet real time services have gained popularity during the past few years; IP (Internet Protocol) telephony and different streaming applications are already common in the Internet. These services have different requirements for the data connection compared to, for example, transferring facsimiles or email messages. Therefore the connection for the data transfer is usually established according to the service requirements, such as the Quality of Service (QoS) requirement. This, however, makes the use of many kinds of services during the same connection difficult or impossible.

In order to better understand the problems of the prior art solutions and the idea of the present invention, the structure of a prior art digital cellular radio system is next described in short, and GPRS is then described in more detail by briefly describing some parts of said specification [1].

FIG. 1a shows a version of a prior known GSM cellular radio system. The terminals MS are connected to the radio access network RAN which includes the base stations and the base station controllers/radio network controllers RNC. The core network CN of a cellular radio system comprises mobile services switching centres (MSC) and related transmission systems. If the system supports GPRS services, the core network also comprises Serving GPRS Support Nodes (SGSN) and Gateway GPRS Support nodes (GGSN). According e.g. to the GSM+ specifications developed from GSM the core network may provide new services such as GPRS. The new types of radio access networks can co-operate with different types of fixed core networks CN and especially with the GPRS network of the GSM system.

Figure 1B:
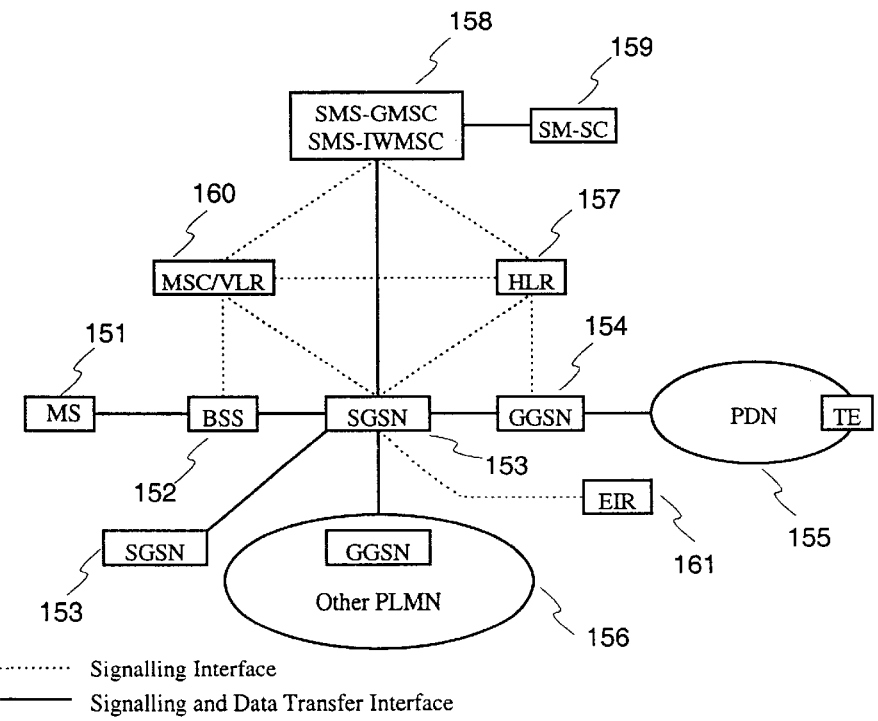

FIG. 1b shows an architecture of a general packet radio service (GPRS). The GPRS is a new service that is currently based on the GSM system but it is supposed to be generic in the future. GPRS is one of the objects of the standardisation work of the GSM phase 2+ and the UMTS at the ETSI (European Telecommunications Standards Institute). The GPRS operational environment comprises one or more subnetwork service areas, which are interconnected by a GPRS backbone network. A subnetwork comprises a number of packet data service nodes (SN), which in this application will be referred to as serving GPRS support nodes (SGSN) 153, each of which is connected to the mobile telecommunications system (typically to a base station through an interworking unit) in such a way that it can provide a packet service for mobile data terminals 151 via several base stations 152, i.e. cells. The intermediate mobile communication network provides packet-switched data transmission between a support node and mobile data terminals 151. Different subnetworks are in turn connected to an external data network, e.g. to a Public Data Network (PDN) 155, via GPRS gateway support nodes GGSN 154. The GPRS service thus allows the provision of packet data transmission between mobile data terminals and external data networks when the appropriate parts of a mobile telecommunications system function as an access network.

In order to access the GPRS services, a mobile station shall first make its presence known to the network by performing a GPRS attachment. This operation establishes a logical link between the mobile station and the SGSN, and makes the mobile station available for SMS (Short Message Services) 158, 159, over GPRS, paging via SGSN, and notification of incoming GPRS data. More particularly, when the mobile station attaches to the GPRS network, i.e. in a GPRS attachment procedure, the SGSN creates a mobility management context (MM context). Also the authentication of the user is carried out by the SGSN in the GPRS attachment procedure. In order to send and receive GPRS data, the MS shall activate the packet data address wanted to be used, by requesting a PDP activation procedure (Packet Data Protocol). This operation makes the mobile station known in the corresponding GGSN, and interworking with external data networks can commence. More particularly, a PDP context is created in the mobile station and the GGSN and the SGSN. The packet data protocol context defines different data transmission parameters, such as the PDP type (e.g. X.25 or IP), the PDP address (e.g. X.121 address), the quality of service (QoS) and the NSAPI (Network Service Access Point Identifier). The MS activates the PDP context with a specific message, Activate PDP Context Request, in which it gives information on the TLLI, the PDP type, the PDP address, the required QoS and the NSAPI, and optionally the access point name (APN).

FIG. 1b also shows the following GSM functional blocks: Mobile Switching Center (MSC)/Visitor Location Register (VLR) 160, Home Location Register (HLR) 157 and Equipment Identity Register (EIR) 161. The GPRS system is usually also connected to other Public Land Mobile Networks (PLMN) 156.

Functions applying digital data transmission protocols are usually described as a stack according to the OSI (Open Systems Interface) model, where the tasks of the various layers of the stack, as well as data transmission between the layers, are exactly defined. In the GSM system phase 2+, which in this patent application is observed as an example of a digital wireless data transmission system, there are five operational layers defined.

Figure 2:
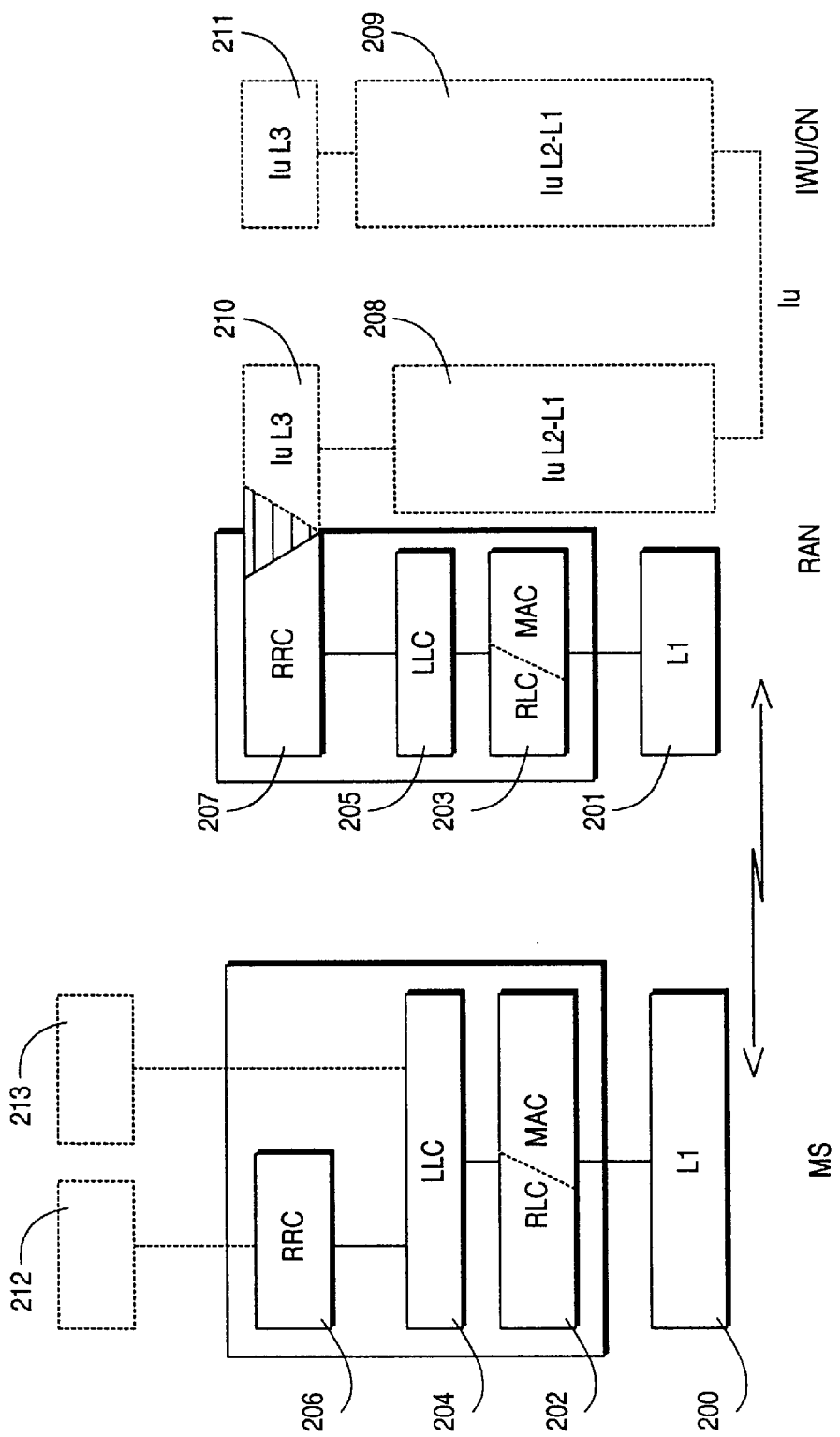

Relations between the protocol layers are illustrated in FIG. 2. The lowest protocol layer between the mobile station MS and the base station subsystem is layer 1 (L1) 200, 201, which corresponds to a physical radio connection. Above it, there is located an entity corresponding to the layers 2 and 3 of a regular OSI model, wherein the lowest layer is a radio link control/media access control (RLC/MAC) layer 202, 203; on top of it a logical link control (LLC) layer 204, 205; and topmost a radio resource control (RRC) layer 206, 207. Between the base station subsystem UTRA BSS of the generic radio access network and an interworking unit/core network IWU/CN located in the core network, there is assumed to be applied a so-called Iu interface, where the layers corresponding to the above described layers from L1 to LLC are the layers L1 and L2 of the OSI model (blocks 208 and 209 in the drawing), and the layer corresponding to the above described RRC layer is the layer L3 of the OSI model (blocks 210 and 211 in the drawing).

The mobile station MS must include a higher-level control protocol 212 and a protocol 213 for serving higher-level applications, of which the former communicates with the RRC layer 206 in order to realise control functions connected to data transmission connections, and the latter communicates directly with the LLC layer 204 in order to transmit such data that directly serves the user (for instance digitally encoded speech). In the mobile station of the GSM system, blocks 212 and 213 are included in the above-mentioned MM layer.

In GPRS, a Temporary Block Flow (TBF) is created for transferring data packets on a packet data channel. The TBF is a physical connection used by two mutually communicating Radio Resource (RR) peer entities to support the unidirectional transfer of Logical Link Control (LLC) Packet Data Units (PDU) from upper Logical Link Control (LLC) layers on physical channels for packet data. We will consider separately uplink TBFs (transfer of data from the mobile station to the base station) and downlink TBFs (transfer of data from the base station to the mobile station).

During an uplink TBF the mobile station will organise the data to be transferred into Protocol Data Units or PDUs. These are in turn divided into smaller parts which are distributed into data blocks on the RLC layer which defines the procedures related to information transfer over the radio interface. Each RLC data block will have a corresponding identification number as well as a multitude of associated fields containing information that relates to the contents and significance of the RLC data block. During a downlink TBF a similar arrangement of successive RLC data blocks is produced by the network and transmitted to the mobile station.

The TBF is thus established using a determined set of parameters for the data transfer, such as acknowledged/ unacknowedged RLC mode, radio priority etc. If the mobile station with an existing TBF needs to transfer LLC PDUs with a different RLC mode the existing TBF is released and the new TBF is established for the new RLC mode. This means that the mobile station must request a completely new allocation of radio resources by first transmitting a request message on an access channel (PRACH or RACH; Packet Random Access Channel or Random Access Channel depending on whether or not the first one of these is available). The network will either grant or reject the request by sending a corresponding message on an access grant channel (PAGCH or AGCH; Packet Access Grant Channel or Access Grant Channel, same considerations of availability apply). This procedure of changing the RLC mode may cause an unacceptable delay in the uplink data transfer.

In downlink, to change RLC modes the network must allow for the termination timer in the mobile station to expire for terminating the existing TBF allocation, and establish a completely new TBF by sending a Packet Downlink Assignment message on a PCCCH or CCCH (Packet Common Control Channel or Common Control Channel depending on availability). This procedure may also cause an unacceptable delay in the downlink data transfer.

In the prior art systems it is not possible to transfer simultaneously LLC PDUs using different RLC modes, different radio priorities or different throughput classes. This is a difficult limitation, because in a GPRS system a mobile station may support different types of services and therefore there may also exist a need to transfer LLC PDUs with different parameters simultaneously. Especially, if one of the supported services is a real time service, the delay caused by releasing the existing TBF and the establishment of new TBF to support the service could be unacceptable.

It is thus an object of this invention to provide a method and an arrangement that offers solutions to the prior art problems. Especially, it is an object of this invention to provide a solution for enabling a fluent continuation from a packet-switched service using a first set of communication parameters to second one with a second set of parameters. It is also an object of the invention that it will require only a moderate amount of signalling over the radio interface.

The objects of the invention are fulfilled by providing a procedure, in which at least two simultaneous TBFs can be assigned for a determined transfer direction between a mobile station and the network. Thus a new TBF can be created when data transfer requires a change of communication parameters, and there are no pauses in the data transfer due to release procedures of the existing TBF. It is also possible to use several different types of services simultaneously, because with the present invention it is not necessary first to release the on-going temporary block flow in order to establish a new TBF for transferring LLC Packet Data Units using for example different RLC modes simultaneously, such as transferring IP telephony and Mobility Management messages.

It is thus characteristic to a method according to the present invention for transferring at least one data flow by creating at least one connection between a mobile station and network on a packet radio service of a telecommunication system, said at least one connection constituting a temporary block flow on a packet data channel, that at least two simultaneous temporary block flows are assigned for transferring the at least one data flow during the at least one connection.

The invention also applies to a telecommunications system for transferring at least one data flow by creating at least one connection between a mobile station and network on a packet radio service of a telecommunication system, said at least one connection constituting a temporary block flow on a packet data channel, comprising means for assigning for a determined transfer direction at least two simultaneous temporary block flows for transferring the at least one data flow during the at least one connection.

The invention also applies to a mobile station comprising means for transmitting/receiving at least one data flow on at least one connection between the mobile station and network on packet radio service of a telecommunication system, said at least one connection constituting a temporary block flow on a packet data channel, the mobile station comprising means for constituting for a determined transfer direction at least two simultaneous temporary block flows.

Preferred embodiments of the invention are presented in dependent claims.

The inventive procedures used for TBF management support one or several simultaneous TBFs for a determined transfer direction between a mobile station and the network. Each TBF preferably comprises different identifiers (TFI), different RLC parameters used for controlling the transmitting/receiving of data, and separate data buffers. Radio resources for the TBFs are preferably assigned in such a way that the multislot capability of the mobile station is taken into account Radio resources assigned for the temporary block flows comprise one or several channels that may also be partly the same channels or exactly the same channels.

In uplink, if there is no existing TBF between the mobile station and the network in the direction concerned, a TBF can be established in a prior known manner as is described in [1]. If the mobile station has already an existing TBF in uplink, the establishment of further TBF may be preferably requested as follows:

The mobile station may transmit a separate control message, such as a Packet Resource Request message, to the network using the existing radio resources of existing TBF by replacing the sending permission of the existing TBF with the control message. The network will then respond to the mobile station using any existing radio resources, e.g. on the resources of the same TBF on which the network has received the request message.

The mobile station may include the TBF establishment request into a message belonging to an existing TBF when sending the message to the network.

The mobile station may use a signalling or a control channel to request the establishment of a new TBF.

In downlink, if there is no existing TBF between the mobile station and the network in the direction concerned, a TBF can be established in a prior known manner as described in document [1]. In case there is already an existing downlink TBF between the mobile station and the network, an establishment of a further TBF may be accomplished preferably in one of the following ways:

The network may send a separate control message, such as a Packet downlink Assignment, to the mobile station using the existing radio resources of another TBF by replacing the sending permission of the other TBF with the control message.

The network may include network establishment request into a message that belongs to another TBF when sending the message to the mobile station.

The network may also use a signalling channel or a control channel to notify the mobile station of the establishment of a new TBF.

The temporary block flows are scheduled independently, i.e. the transmission and receiving permissions are assigned independently. However, the multislot capability of the mobile station is preferably taken into account. The multislot capability means that the mobile station is able to transmit more than one channel and/or receive more than one channel within the TDMA frame. When using the multislot capability of the mobile station the network should also take into account that the mobile station may require time gaps in order to perform channel and neighbouring cell measurements. The network has the information about the other existing TBF(s) of the mobile station, so the network is able to take the requirements of the mobile station into account. Otherwise, the transfer of data may follow the prior art procedures that are described in [1].

The mobile station may get individual identifiers for each TBF. This way the network is able to priorise transmissions of different connections by giving a transmission permission for a determined TBF. Another alternative is that mobile station gets an identifier for all TBFs in a determined transfer direction (uplink/downlink). In this case, for example in uplink data transfer the network gives transmission permissions for the mobile station and the mobile station may decide which one of the uplink TBFs gets the transmission turn. This way the network can not priorise the traffic efficiently.

The release of each TBF can be made independently by, e.g. following the prior art procedures described in [1]. Alternatively the mobile station may inform the network with a message/parameter that it wishes to release all the TBF(s) in the certain transfer direction or that it wishes to release all the TBF(s) in the both transfer directions (uplink and downlink). An advantage of this procedure is that resources are saved, as only one message/parameter is required for releasing many TBFs instead of one message/parameter for each released TBF.

Figure 3:
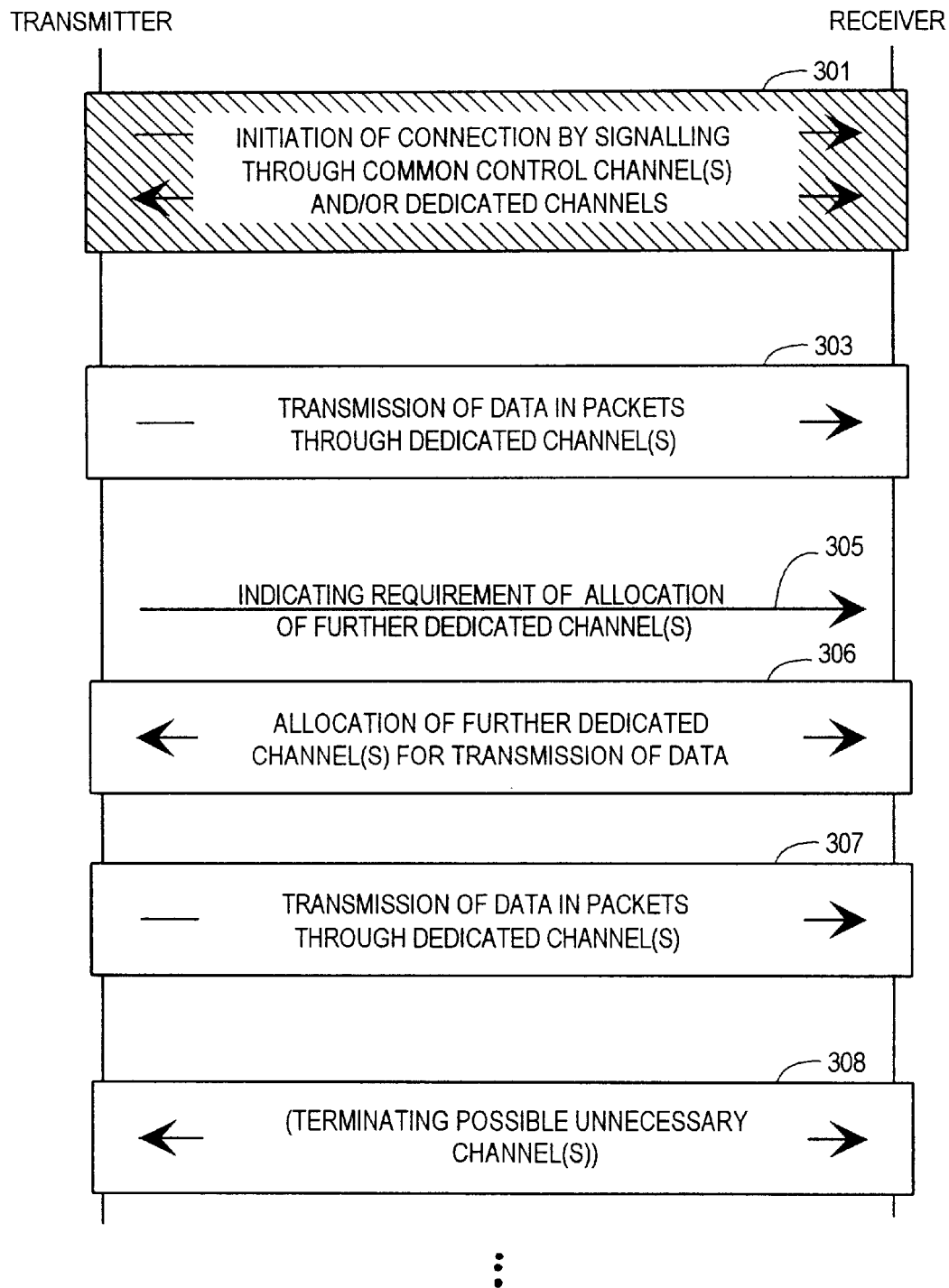
Figure 4A:
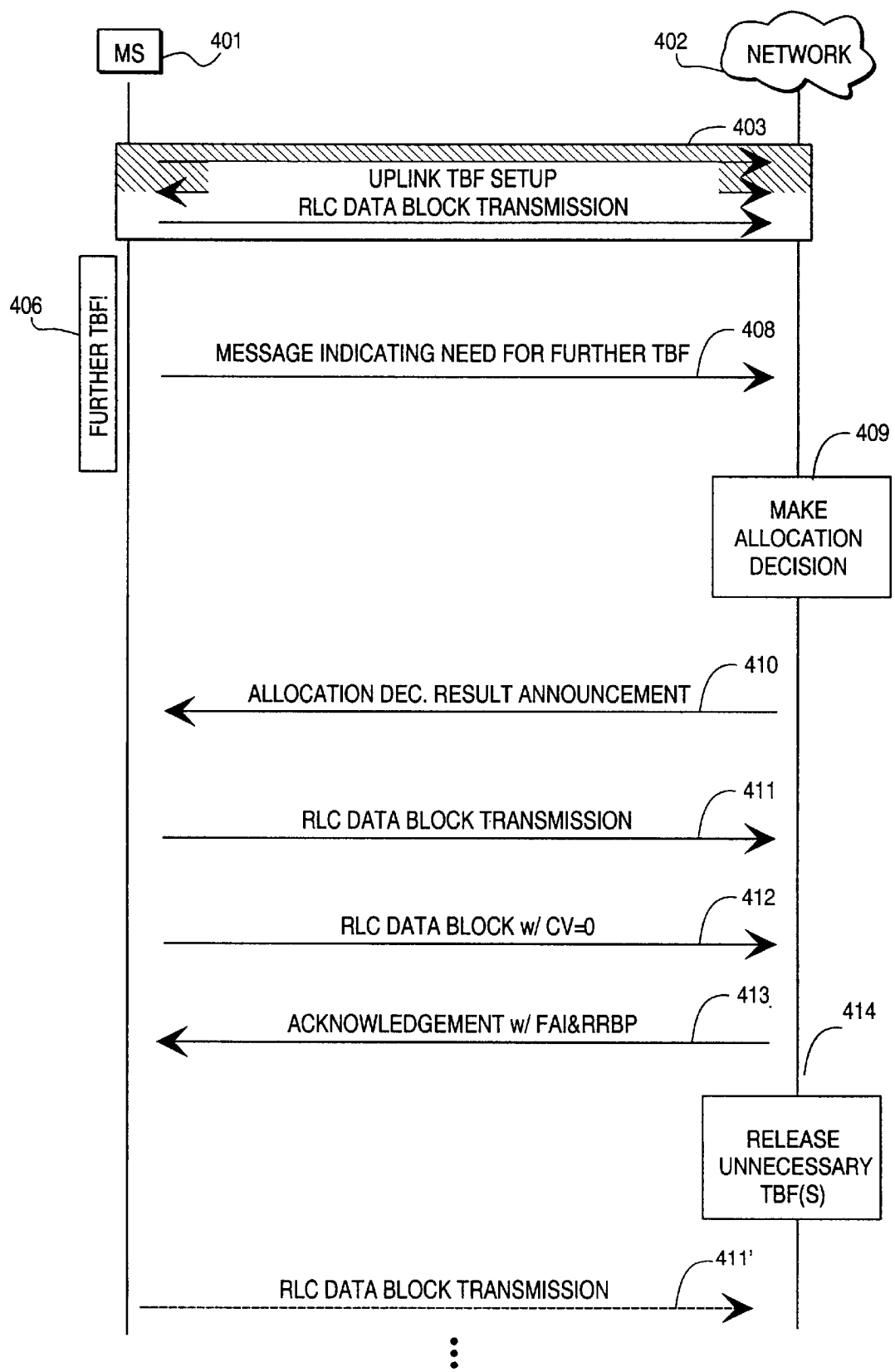
Figure 4B:
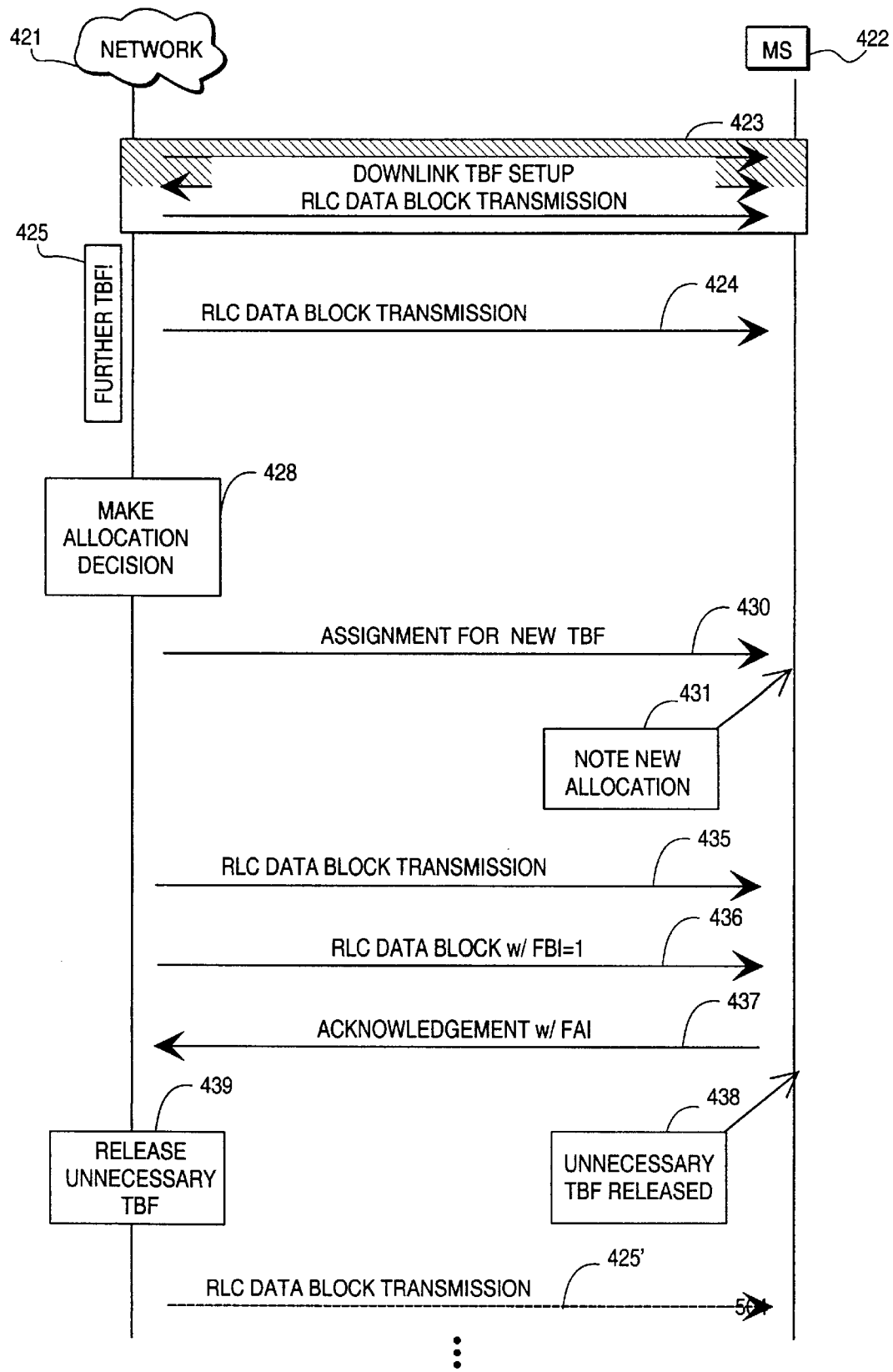
Figure 5:
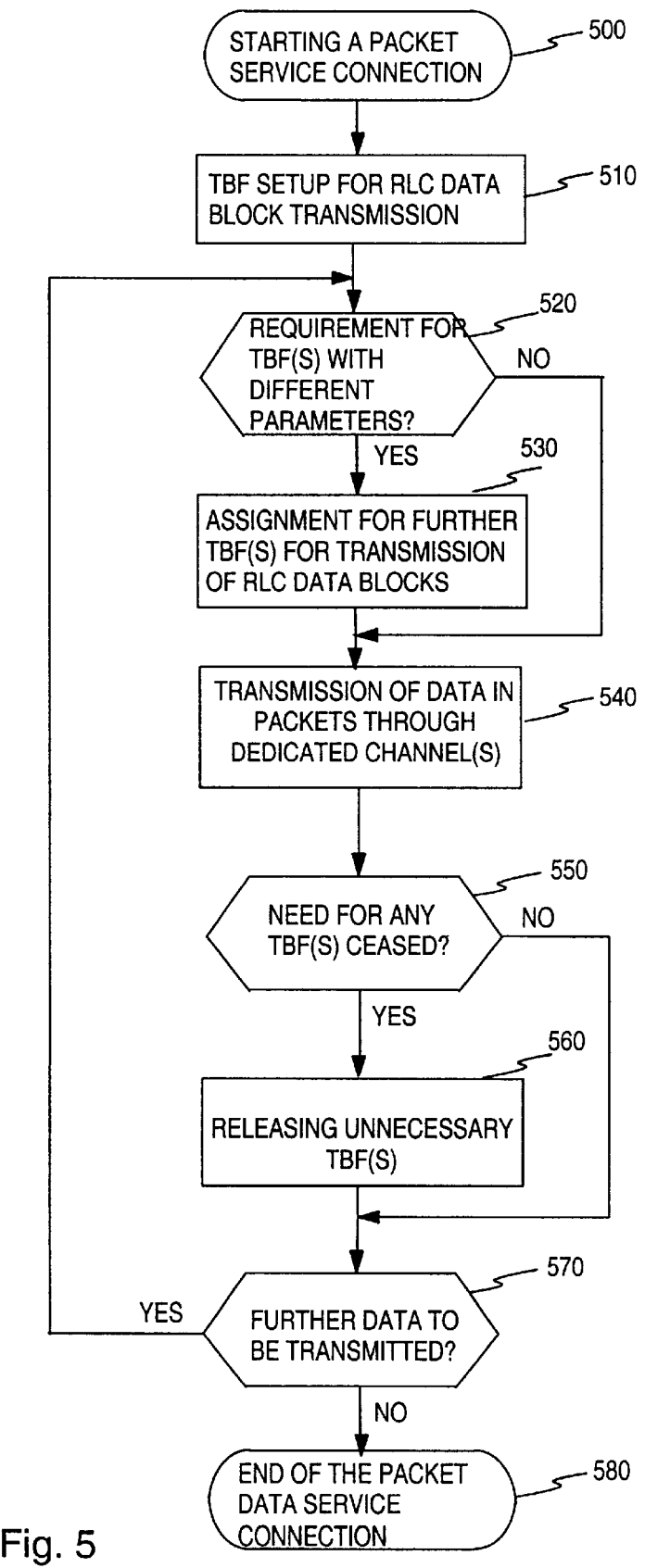
Figure 6:
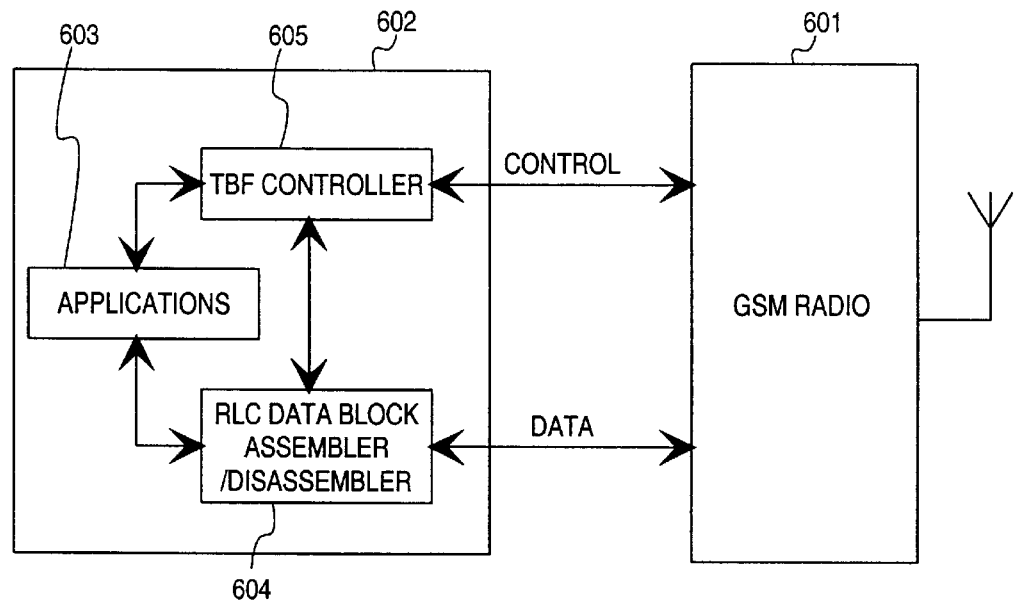
Figure 7:
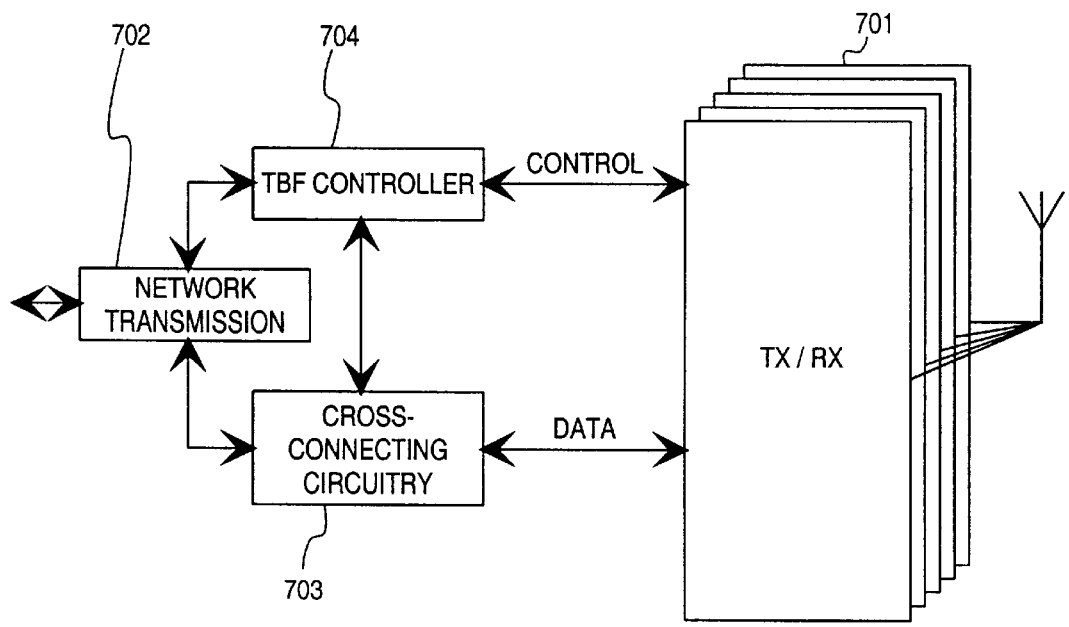

In the following, the invention is described in more detail by means of the attached drawings in which FIGS. 1a, 1b illustrate prior art cellular communications systems, FIG. 2 illustrates protocol levels of a prior art cellular communications system, FIG. 3 illustrates the principle according to the invention as a signal flow diagram, FIG. 4a illustrates an example of a signal flow diagram of an uplink TBF assignment according to the invention, FIG. 4b illustrates an example of a signal flow diagram of a downlink TBF assignment according to the invention, FIG. 5 illustrates a flow diagram of the use of TBFs in an exemplifyig method according to the invention, FIG. 6 illustrates an example of a mobile station according to the invention and FIG. 7 illustrates an example of a base station according to the invention.

FIGS. 1 and 2 were described above in the prior art description. In the following, first the principles of the invention are described referring to FIG. 3. Next, exemplifying methods for the assignment of TBFs are described referring to FIGS. 4a, 4b, and 5. Finally a mobile station and a cellular system according to the invention are shortly described referring to FIGS. 6 and 7.

In FIG. 3 a transmitting device and a receiving device are illustrated schematically as communicating parties. We will assume that both of these devices are capable of transmitting and receiving, but the designations refer to their primary functions within a packet-switched communication connection. We will further assume that the transmitter and the receiver are operating in a multi-user environment where there is a certain set of common control channels available to a large number of users and where dedicated communication channels may be allocated to individual connections according to need.

The hatched block 301 represents the initiation of a packet-switched communication connection which starts by the transmitter sending an initial indication of its need to set up a connection. This initial transmission takes place usually on a common control channel, as illustrated by the upper, single-ended arrow in block 301, and some further exchange of information on the common control channels or on dedicated channels may follow it as illustrated by the lower, double-ended arrow in block 301. The device which is responsible for allocating the dedicated communication channels allocates at least one dedicated channel for the needs of the connection; the double-ended arrow in block 301 represents the fact that two-way traffic may be required to acknowledge the allocation, or the actual allocation message may travel in either direction depending on which one of the devices performs the allocation. The dedicated communication channels may comprise data channels, control channels, and/or other kinds of channels according to need.

The actual transmission of packets takes place on the dedicated communication channel(s) according to block 303. For the purposes of generally describing the communication connection we may suppose that the allocation of dedicated communication channel(s) remains valid for as long as the transmitting device has remaining packets to transmit. At some stage the transmitting device may need transmission in a dedicated channel with communication parameters that are different from the existing channel(s). A prior art arrangement would then result in channel allocations made in block 302 being cancelled even if the existing channel(s) would still be needed for transmission, and a new initiation round through the common control channel(s) like the one of block 301 would be required. According to the invention, the transmitting device which can continue to exploit the existing dedicated channel allocation sends an indication 305 about the need for allocation of further dedicated channel(s).

The configuration of the further dedicated channel(s) is performed as illustrated by block 306. After a further valid channel allocation has been established by allocating new resources the transmission of packets may continue on the new (and old) channel(s) as illustrated by block 307. In case the transmitting device again needs transmission in a dedicated channel with communication parameters that are further different from the existing channel(s), the steps 305 through 307 can be repeated. The invention does not limit the number of repetitions through steps 304 to 307. After the reservoir of packets has been exhausted for any existing connection the connection may be terminated according to any known procedure, as illustrated by block 308.

We will next describe the application of the above-explained principle to an uplink TBF that generally corresponds to the previously mentioned GPRS specifications. In FIG. 4a the mobile station 401 is the transmitter, and the receiver is generally represented by the network 402. The procedures concerning the RLC protocol layer take place between the mobile station and a base station subsystem, the latter comprising generally base stations and a base station controller or a similar supervisory unit. However, it is to be understood that the network devices that take part in the communication connection as a whole are the known parts of a GSM/GPRS network, comprising but not being limited to a base station, a base station controller or a radio network controller, a packet control unit, a serving GPRS support node and a gateway GPRS support node.

Setting up an uplink TBF and transmitting a flow of RLC data blocks through it as illustrated by block 403 takes place according to known procedures which are outside the scope of the present invention and will not be described in detail. The hatched upper part of block 403 reminds the reader of the fact that these procedures usually start from the common control channels. If at the time of setting up an uplink TBF there already exists a downlink TBF between the mobile station and the base station, the mobile station will transmit the initial request for setting up the uplink TBF through the signalling mechanisms related to the downlink TBF. The messages in which such a request will be communicated are the Packet Downlink Ack/Nack messages which the mobile station transmits on a Packet Associated Control Channel or PACCH. The invention does not set any specific limits to the procedures that are used to initially set up the TBF, but it is very illustrative of the applicability of the invention to regard the setup as taking place on the common control channels.

According to block 406, at some stage during the connection, the mobile station needs a TBF with different communication parameters than the existing TBF. Then, instead of transmitting a simple acknowledgement for the final Packet Uplink Ack (or Nack), at step 408 the mobile station transmits a message that contains an indication about its need for new TBF(s). The different possibilities for transmitting this message where previously discussed. This leads to an allocation decision in the 409 network for the new TBF(s).

At some stage the mobile station transmits an RLC data block with CV=0. The network may interpret this as a ceasing requirement for the TBF concerned. At step 413 the network transmits a normal Packet Uplink Ack (or Nack) message with the FAI indicating its finality. The unnecessary TBF is then released, 414. If there are still existing TBFs, these can be used for further data transmission, 411'.

We will next describe the application of the principle of FIG. 3 to a downlink TBF that generally corresponds to the previously mentioned GPRS specifications. In FIG. 4b the transmitter is generally represented by the network 421 and the mobile station 422 is the receiver. We will later describe in detail the role of the different network devices in the operation described generally on the left side of FIG. 4b and the right side of FIG. 4b.

The setup of the first TBF and the operation of a downlink TBF will follow the previously known procedures. These are again outside the scope of the invention and represented generally by block 423 in FIG. 4b. If an uplink TBF exists at the time of setting up the downlink TBF, for the network can use a specific Assignment message in the dedicated control channels of the uplink TBF to initiate the setup of a downlink TBF.

At step 424 the network transmits the RLC data blocks using the existing TBF(s). According to block 425, at some stage during the connection the network needs a TBF with different communication parameters than the existing TBF (s). The network then makes an allocation decision 428 and informs the mobile station of the assignment of the new TBF, phases 430, 431. The information of assigning new TBF(s) can be transferred to the mobile station e.g. with one of the previously described methods. After this, the new TBF(s) and, if needed, the previously existed TBF(s) can be used for packet data transmission in phase 435.

At step 436 the network transmits the RLC data block which it currently regards as the last one for the TBF concerned, and indicates this by setting the FBI bit of that RLC data block to '1'. This leads to the release of the unnecessary TBF(s) in phases 437–439. Any remaining TBF(s) can then be used for the transmission of further data packets to be transmitted.

FIG. 5 illustrates a flow diagram for an example of the use of TBFs according to the invention. When a connection for a packet data service is required, phase 500, a TBF is set up for the transmission of RLC data blocks, phase 510. Should a requirement rise for a TBF with different communication parameters in phase 520, further TBF(s) are assigned for the transmission of RLC data blocks in phase 530. After the new TBF(s) are assigned, data packets are transmitted through the dedicated channels, 540. After the need of any TBF(s) has ceased, phase 550, the unnecessary TBF(s) are released in phase 560. The phases 520–560 are then repeated as long as there is further data to be transmitted, 570. When channels for data packet transmission are no longer needed, the packet data service connection is ended, 580.

We will next consider two examples of alternatives for transferring information on the parameters (RLC mode etc.) that are related to the data transferred, when the mobile station and the network have initiated several TBFs with different parameters. In the first example the mobile station or the network informs to the other end when the parameter set is to be changed and the state of connection is then changed. This information can be given, for example, in a header of a signalling message of data, or alternatively with a signalling message transferred through dedicated resources or through a signalling channel. In the uplink data transfer direction this would mean that the mobile station creates an uplink connection to the network, such as TBF, and transfers data, such as IP data, through the created connection. Let us presume that the mobile station then, during the data transfer, should transmit data related to different parameters (RLC mode, priority etc.), such as in case of Mobility Management procedure (location update). In this case the mobile station would signal to the network that another virtual TBF is created. These two TBFs with different parameters can be multiplexed to e.g. the same uplink resources. Thus, after transferring e.g. Internet Protocol phone data, the mobile station may inform the network that the mobile station soon starts to transmit data related to second parameters. The network and the mobile station then save the state of the IP connection by, for example, setting the connection to hold state, storing the timer values, transmission variables, acknowledge variables etc. After this the mobile station and the network may start using the parameters created for the second data, such as data of MM procedure. This way the parameter sets can be changed without the need for creating new connections and releasing the old ones, and thus the second TBF may use the resources of the first TBF. For example, when there is a silent moment with no data transferred in a IP phone connection, the MS may use the existing resources for a MM procedure.

In another example, after the mobile station and the network initiate connections with different parameter sets, the other end is then informed, together with the transferred data, on the parameters (RLC mode etc.) that are related to the concerned transferred data packets. This solution is, however, not as good when multiplexing is concerned. This is because in the uplink data transfer the network is not able to react quickly to, for example, priorising data with different priorities when giving transmission permissions. In downlink data transfer, however, such a problem would not necessarily exist.

We will next briefly describe a mobile station and a base station subsystem according to an advantageous embodiment of the invention. FIG. 6 illustrates schematically a mobile station which comprises a GSM radio transceiver 601 known as such as means for implementing packet-switched radio connections with a remote base station. A packet data part 602 is coupled to the GSM radio transceiver. The source and sink of transmitted and received data respectively is the applications block 603, and the transmission of data between it and the GSM radio transceiver goes through a RLC data block assembler/disassembler 604. A TBF controller 605 is responsible for setting up and maintaining the TBFs according to the needs expressed by the applications block on one hand and to the setup requests received from the network on the other. According to the invention the TBF controller 605 is arranged firstly to construct messages for informing the network of the need of new TBF(s), and secondly, to control procedures for setting up new TBF(s) and maintaining TBF(s) that are simultaneous with other existing TBF(s) of the mobile station.

FIG. 7 illustrates schematically a base station which comprises a plurality of transmit (TX) and receive (RX) units 701, a transmission unit 702 for communicating with a packet-switched network (GPRS) and a cross-connecting unit 703 for arranging the mapping of data between radio connections and network connections. It also comprises a TBF controller 704 responsible for setting up and maintaining the TBFs according to the setup requests received from the network on one hand and the setup requests received from the mobile stations on the other. According to the invention the TBF controller 704 is arranged firstly to make assignments for several TBFs for a single mobile station and to construct messages in order to set up the TBFs. The TBF controller also watches for possible requests from the mobile station for additional TBF(s).

In general, the processing of information in a telecommunication device takes place in an arrangement of processing capacity in the form of microprocessor(s) and memory in the form of memory circuits. Such arrangements are known as such from the technology of mobile stations and fixed network elements. To convert a known telecommunication device into a telecommunication device according to the invention, it is necessary to store into the memory means a set of machine-readable instructions that instruct the microprocessor(s) to perform the operations described above. Composing and storing into memory of such instructions involves known technology which, when combined with the teachings of this patent application, is within the capabilities of a person skilled in the art.

Above, an example embodiment of the solution according to the invention has been described. The principle according to the invention can naturally be modified within the frame of the scope defined by the claims, for example, by modification of the details of the implementation and ranges of use.

Although the foregoing description uses the reserved names of certain messages and communication concepts which are strictly associated with a certain specification of a single packet-switched communication system, it is to be noted that the invention is generally applicable to all such communication systems with the allocation of dedicated channel(s) for data services. One should also note that one or several connections between a mobile station and the network can be used in the transfer of data flow(s). For example, there may be data transfer from/to a mobile station to/from several base stations.

Above, some examples of TBF communication parameters are given. However, many other alternative communication parameters that determine properties or identity of a TBF can be applied. The different simultaneous TBFs according to the invention may also have the same communication parameters. Even the data buffers and identifiers may be same. An LLC frame, for example, may in this case include identifiers that SGSN and MS require for identifying the data. In the RLCIMAC level the data of different TBFs can thus appear as "similar" packets.

Cited Documents:

[1] Digital cellular telecommunications system (Phase 2+); General Packet Radio Service (GPRS); Mobile Station (MS)—Base Station System (BSS) interface; Radio Link Control/Medium Access Control (RLC/MAC) protocol (GSM 04.60 version 6.1.0); European Telecommunications Standards Institute

What is claimed is:

1. A method for transferring at least one data flow by creating at least one connection between a mobile station and network on a packet radio service of a telecommunication system (301, 303, 510), said at least one connection constituting a temporary block flow on a packet data channel, characterised in that at least two simultaneous temporary block flows are assigned for transferring the at least one data flow in a determined transfer direction during the at least one connection (306, 307, 530).

2. A method according to claim 1, characterised in that the at least two simultaneous temporary block flows have different communication parameters.

3. A method according to claim 1, characterised in that the mobile station sends a separate uplink control message to the network using the radio resources of the existing TBF by replacing the sending permission of the existing TBF with the control message, and the network responds to the mobile station using the radio resources of another TBF.

4. A method according to claim 3, characterised in that the separate control message is a Packet Resource Request message.

5. A method according to claim 1, characterised in that the mobile station includes a TBF establishment request into a message to the network on the existing TBF.

6. A method according to claim 1, characterised in that the mobile station uses uplink signalling or control channel to request the establishment of a new TBF.

7. A method according to claim 1, characterised in that the network sends a separate control message to the mobile station using the radio resources of the existing TBF by replacing the sending permission of the other TBF with the control message.

8. A method according to claim 7, characterised in that the separate control message is a Packet Downlink Assignment.

9. A method according to claim 1, characterised in that the network includes a TBF establishment request into a message of the existing TBF when sending the message to the mobile station.

10. A method according to claim 1, characterised in that the network uses a signalling channel or a control channel to notify the mobile station of the establishment of a new TBF.

11. A method according to claim 1, characterised in that a message/parameter is transmitted from a mobile station to the network for releasing all TBFs between the mobile station and the network in a determined transfer direction.

12. A method according to claim 1, characterised in that a message/parameter is transmitted from a mobile station to the network for releasing all TBFs between the mobile station and the network in both transfer directions.

13. A method according to claim 1, characterised in that an individual identifier is assigned for each simultaneously existing TBF between a mobile station and the network.

14. A method according to claim 1, characterised in that a common identifier is assigned for each existing TBF in a determined transfer direction between the mobile station and the network.

15. A method according to claim 1, characterised in that when a parameter related to the transferred data is to be changed, information is transferred between the mobile station on the expected change.

16. A method according to claim 15, characterised in that the information is transferred in a signalling message/ indication of data.

17. A method according to claim 15, characterised in that the information is transferred in a signalling message transferred through dedicated resources or through a signalling channel.

18. A method according to any of the claim 1, characterised in that information is transferred between the mobile station on the parameters related to the transferred data together with the concerned transferred data packets.

19. A method according to claim 1, characterised in that the packet radio service is a GPRS.

20. A telecommunications system for transferring at least one data flow by creating at least one connection between a mobile station and network on a packet radio service of a telecommunication system, said at least one connection constituting a temporary block flow on a packet data channel, characterised in that it comprises means (702–704) for assigning for a determined transfer direction at least two simultaneous temporary block flows for transferring the at least one data flow during the at least one connection.

21. A mobile station comprising means for transmitting/ receiving at least one data flow on at least one connection between the mobile station and network on a packet radio service of a telecommunication system, said at least one connection constituting a temporary block flow on a packet data channel, characterised in that the mobile station comprises means (603–605) for constituting for a determined transfer direction at least two simultaneous temporary block flows.

* * * * *